(12) United States Patent
Christensen et al.

(10) Patent No.: US 8,312,705 B2
(45) Date of Patent: Nov. 20, 2012

(54) PROPELLANT GAS CONTROL VALVE

(75) Inventors: Don Christensen, Phoenix, AZ (US);
Steve Abel, Chandler, AZ (US);
Raymond R. Tseng, Chandler, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 1135 days.

(21) Appl. No.: 12/190,283

(22) Filed: Aug. 12, 2008

(65) Prior Publication Data
US 2010/0038565 A1 Feb. 18, 2010

(51) Int. Cl.
*F02K 9/80* (2006.01)
*B63H 11/107* (2006.01)
*F16K 31/12* (2006.01)

(52) U.S. Cl. .......................... 60/229; 137/495
(58) Field of Classification Search .................... 60/228, 60/229; 137/495
See application file for complete search history.

(56) References Cited

U.S. PATENT DOCUMENTS

| | | | |
|---|---|---|---|
| 3,180,355 A * | 4/1965 | Long ............................ | 137/495 |
| 3,250,411 A * | 5/1966 | Salna et al. ................... | 414/713 |
| 3,304,723 A * | 2/1967 | Gaura ............................ | 60/233 |
| 3,721,402 A * | 3/1973 | Holland ........................ | 60/229 |
| 3,954,151 A | 5/1976 | Budzich et al. | |
| 4,282,896 A * | 8/1981 | Makino ......................... | 137/495 |
| 5,822,672 A | 10/1998 | Johdai et al. | |
| 5,850,850 A | 12/1998 | Mudd | |
| 5,913,577 A | 6/1999 | Arndt | |
| 6,233,919 B1 | 5/2001 | Abel et al. | |
| 6,357,465 B1 | 3/2002 | Caldwell et al. | |
| 6,598,385 B1 | 7/2003 | Abel et al. | |
| 6,860,293 B2 | 3/2005 | Douglass et al. | |
| 6,951,209 B2 * | 10/2005 | Yanase et al. ................. | 137/587 |
| 2003/0151011 A1 | 8/2003 | Hirota et al. | |

* cited by examiner

*Primary Examiner* — Ted Kim
(74) *Attorney, Agent, or Firm* — Ingrassia Fisher & Lorenz, P.C.

(57) ABSTRACT

A gas control valve is configured to controllably supply propellant gas to a thruster so that the thruster may produce thrust over a relatively wide range, and so that the thruster exhibits relatively fine minimum impulse bit (MIB) performance. The gas control valve includes a pilot stage having a pilot valve, and a main stage having a main valve. The gas control valve responds to control signals supplied to the pilot stage and is configured such that for commands of relatively short duration, only the pilot valve responds. Conversely, for commands of relatively longer duration, the pilot valve and main valve both respond.

19 Claims, 4 Drawing Sheets

PROPELLANT GAS CONTROL VALVE

TECHNICAL FIELD

The present invention generally relates to propellant gas control and, more particularly, to a propellant gas control valve that exhibits a relatively fast response time and relatively fine minimum impulse bit (MIB) performance.

BACKGROUND

Propellant gas thrusters are used in rockets, missiles, interceptors, and various other vehicles and environments. For example, propellant gas thrusters may be used to control vehicle propulsion, steering, lateral divert, and attitude control for missiles, munitions, and various spacecraft. A propellant gas thruster typically receives high-energy propellant gas from, for example, a solid or liquid propellant gas generator. Depending upon the particular end-use system in which the propellant gas thruster is installed, propellant gas flow through the propellant gas thruster is preferably controlled to vary the thrust, pitch, yaw, roll, spin rate, and/or other dynamic characteristics of a vehicle in flight.

For some end-use systems, there is a need for a propellant gas thruster that is able to supply thrust in the range of 2 to 20 pound-force (lbf). It is furthermore desirable that the propellant gas thruster is sufficiently controllable to allow for propellant management, and that it exhibits a relatively fine impulse resolution (e.g., a relatively low minimum impulse bit (MIB)). Presently known propellant gas thruster configurations do not address this combination of needs. For example, poppet valve thrusters, due to the on-off behavior of a poppet valve, may be used to provide propellant management. However, poppet valve thrusters provide relatively high thrust levels and exhibit relatively coarse MIB performance. Another propellant gas thruster configuration uses pintle valves. Pintle valve thrusters provide a modulated output and exhibit thrust levels similar to poppet valve thrusters, but tend to have slower response times. One other known thruster configuration, which uses diverter valves, does supply thrust levels in the 2 to 20 lbf range and does exhibit favorable MIB performance. Unfortunately, because diverter valves supply a constant gas flow, diverter valve thrusters may not be used to provide propellant gas management.

Hence, there is a need for a propellant gas thruster that is able to supply thrust over a relatively wide range, from a relatively low value to a relatively high thrust value, and is sufficiently controllable to allow for propellant management, and that exhibits relatively fine MIB performance. The present invention addresses at least this need.

BRIEF SUMMARY

In one embodiment, and by way of example only, a gas control valve includes a pilot stage and a main stage. The pilot stage includes an inlet port, a pilot chamber, and a valve. The pilot stage inlet port is adapted to receive pressurized gas from a pressurized gas source. The pilot stage is adapted to receive control signals and is operable, in response to the control signals, to move the pilot stage valve between a closed position, in which the pilot stage inlet port is not in fluid communication with the pilot stage pilot chamber, and an open position, in which the pilot stage inlet port is in fluid communication with the pilot stage pilot chamber. The main stage includes an inlet port, a control pressure port, an outlet port, and a valve. The main stage inlet port is adapted to receive pressurized gas from the pressurized gas source, and the main stage control pressure port is in fluid communication with the pilot stage pilot chamber. The main stage valve is responsive to differential gas pressure between the main stage inlet port and the pilot stage pilot chamber to move between a low flow position and a plurality of high flow positions. In the low flow position, the main stage control pressure port is in fluid communication with the main stage outlet port and the main stage inlet port is not in fluid communication with the main stage valve outlet port. In each of the plurality of high flow positions, at least the main stage inlet port is in fluid communication with the main stage valve outlet port.

In another exemplary embodiment, a gas control valve includes a pilot stage and a main stage. The pilot stage includes an inlet port, a pilot chamber, a flapper, and a substantially spherical valve element. The pilot stage inlet port is adapted to receive pressurized gas from a pressurized gas source. The flapper is disposed at least partially within the pilot stage pilot chamber and is movable therein. The substantially spherical valve element is disposed within the pilot stage pilot chamber between the flapper and the pilot stage inlet port, and is at least partially responsive to movement of the flapper to move between a first position, in which the pilot stage inlet port is not in fluid communication with the pilot stage pilot chamber, and a second position, in which the pilot stage inlet port is in fluid communication with the pilot stage pilot chamber. The main stage includes an inlet port, a control pressure port, an outlet port, and a valve. The main stage inlet port is adapted to receive pressurized gas from the pressurized gas source, and the main stage control pressure port is in fluid communication with the pilot stage pilot chamber. The main stage valve includes a valve element and a main stage actuator. The main stage valve element is in fluid communication with the main stage inlet port and is movable between a low flow position, in which the main stage inlet port is not in fluid communication with the main stage outlet port, and a plurality of high flow positions, in which the main stage inlet port is in fluid communication with the main stage valve outlet port. The main stage actuator is responsive to differential gas pressure between the main stage inlet port and the pilot stage pilot chamber to move the valve element between the low flow position and the plurality of high flow positions. The main stage actuator includes a housing portion, an actuation element, and a flow passage. The housing portion has an inner surface that defines an actuator chamber. The actuation element is disposed within the actuator chamber and includes at least a first end and a second end. The actuation element first end is in fluid communication with the main stage control pressure port, and the actuation element second end at least engages the valve element. The flow passage includes an inlet and an outlet. The flow passage inlet is in fluid communication with the main stage control pressure port, and the flow passage outlet is in fluid communication with the main stage outlet port.

In yet another exemplary embodiment, a solid propellant management control system includes a propellant gas generator, a controller, and a propellant gas control valve. The propellant gas generator has propellant disposed therein, and is configured to generate propellant gas upon being ignited. The controller is operable to selectively supply control signals. The propellant gas control valve is coupled to receive propellant gas from the propellant gas generator, and is further coupled to receive the control signals and is operable, in response thereto, to selectively discharge the received propellant gas. The propellant gas control valve includes a pilot stage and a main stage. The pilot stage includes an inlet port, a pilot chamber, and a valve. The pilot stage inlet port is coupled to receive propellant gas from the propellant gas generator. The pilot stage is also coupled to receive the control signals and is operable, in response thereto, to move the pilot stage valve between a closed position, in which the pilot stage inlet port is not in fluid communication with the pilot stage pilot chamber, and an open position, in which the pilot stage inlet port is in fluid communication with the pilot stage pilot chamber. The main stage includes an inlet port, a control pressure port, an outlet port, and a valve. The main stage inlet port is coupled to receive propellant gas from the propellant gas generator, and the main stage control pressure port is in fluid communication with the pilot stage pilot chamber. The main stage valve is responsive to differential gas pressure between the main stage inlet port and the pilot stage pilot chamber to move between a low flow position and a plurality of high flow positions. In the low flow position, the main stage control pressure port is in fluid communication with the main stage outlet port and the main stage inlet port is not in fluid communication with the main stage valve outlet port. In each of the plurality of high flow positions, at least the main stage inlet port is in fluid communication with the main stage valve outlet port.

Other independent features and advantages of the preferred gas control valve and propellant management control system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF VARIOUS PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, although the systems and methods are described herein as being implemented in a vehicle, the systems and methods may also be used in energy storage and/or generation systems.

Figure 1:
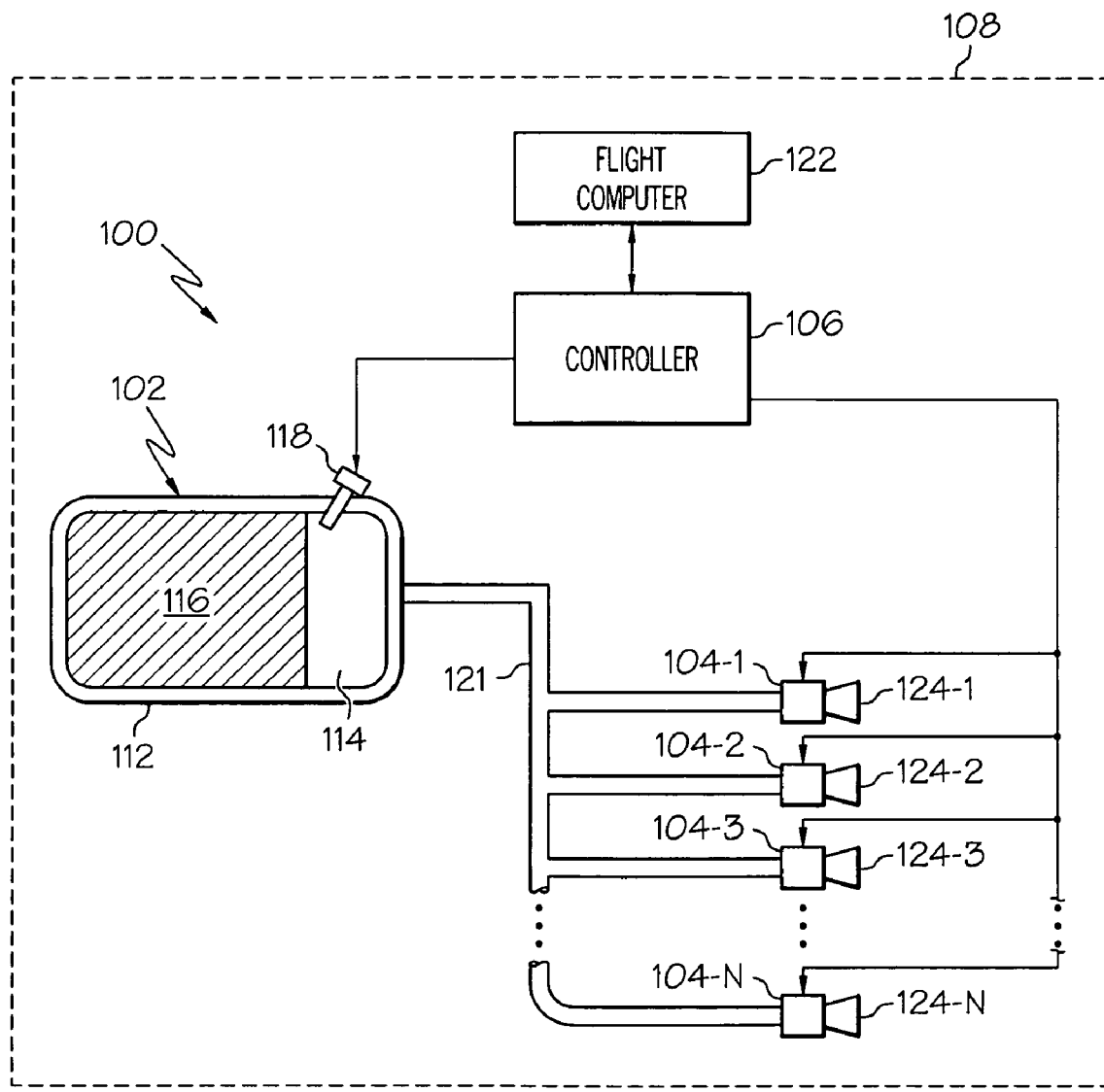
FIG. 1 is a functional block diagram of an exemplary embodiment of a solid propellant gas management system.

Turning first to FIG. 1, a functional block diagram of an exemplary embodiment of a propellant gas management system 100 is depicted. The system 100 includes a propellant gas generator 102, a plurality of gas control valves 104 (e.g., 104-1, 104-1, 104-3, ... 104-N), and a controller 106, which may all be disposed within a projectile body 108. Before proceeding further, it should be appreciated that the system 100 could be implemented with additional components and/or subsystems, not just those depicted and described herein. However, a description of these additional components and/or subsystems is not needed to fully describe or enable the claimed invention, and thus is not included.

Returning once again to the description of the system 100, the propellant gas generator 102 includes a vessel 112 that defines a combustion chamber 114 in which a propellant 116 is disposed. In the depicted embodiment the propellant is a solid propellant, though it will be appreciated that in some embodiments the propellant may be a liquid propellant. The manner in which the solid propellant 116 is formed and subsequently loaded into the combustion chamber 114 are generally well known, and will thus not be further discussed. Moreover, the particular type of solid propellant 116 may vary. Some non-limiting examples of solid propellant 116 include ammonium nitrate and ammonium perchlorate. No matter the particular solid propellant 116 that is used, upon being ignited by an igniter 118, the solid propellant 116 produces propellant gas, which is directed toward the gas control valves 104 via, for example, a suitable manifold 121.

The gas control valves 104 are each in fluid communication with the combustion chamber 114 via a manifold 121, and are each in fluid communication with a downstream thrust nozzle 124 (e.g., 124-1, 124-2, 124-3, ... 124-N). It will be appreciated that the thrust nozzles 124 may be configured to function as reaction control devices, main thrust devices, or both. The gas control valves 104 are each coupled to receive control signals from the controller 106, and are each responsive to the control signals it receives to control the flow of propellant gas to, and thus the amount of thrust produced by, its associated thrust nozzle 124. As will be described in more detail below, the configuration of each thrust nozzle 124 is such that the thrust each produces varies over a relatively wide range, from a relatively low thrust (e.g., about 2 lbf) to a relatively high thrust (e.g., about 20 lbf).

The controller 106, at least in the depicted embodiment, is configured to supply an initiation signal to the igniter 118 and, as noted above, control signals to the gas control valves 104. The initiation signal supplied to the igniter 118 causes the igniter 118 to ignite the solid propellant 116, which in turn generates the propellant gas. It will be appreciated that in alternative embodiments the initiation signal could be supplied from other, non-illustrated devices or systems. The thruster control signals supplied to the gas control valves 104 are used to control thrust, maneuvering, and/or propellant burn rate. For example, the controller 106 may selectively control the gas control valves 104 to maximize axial vehicle thrust, to maximize an attitude or divert maneuver, or to maximize propellant burn rate. Preferably, the control signals comprise pulses, with each pulse having a duty cycle. As will be described further below, the flow of propellant gas to, and thus the amount of thrust produced by, each thrust nozzle 124 may be controlled by varying the duty cycle of the control signals supplied to the associated gas control valve 104.

As FIG. 1 also depicts, the controller 106 may also be in operable communication with a flight computer 122. The flight computer 122, which may be variously implemented and configured, is operable to supply flight control signals to the controller 106 that are at least representative of a commanded projectile flight path. The controller 106 is responsive to the flight control signals to selectively supply the control signals. It will additionally be appreciated that the controller 106 and flight computer 122, and their associated functions, could be integrated into a single device.

Figure 2:
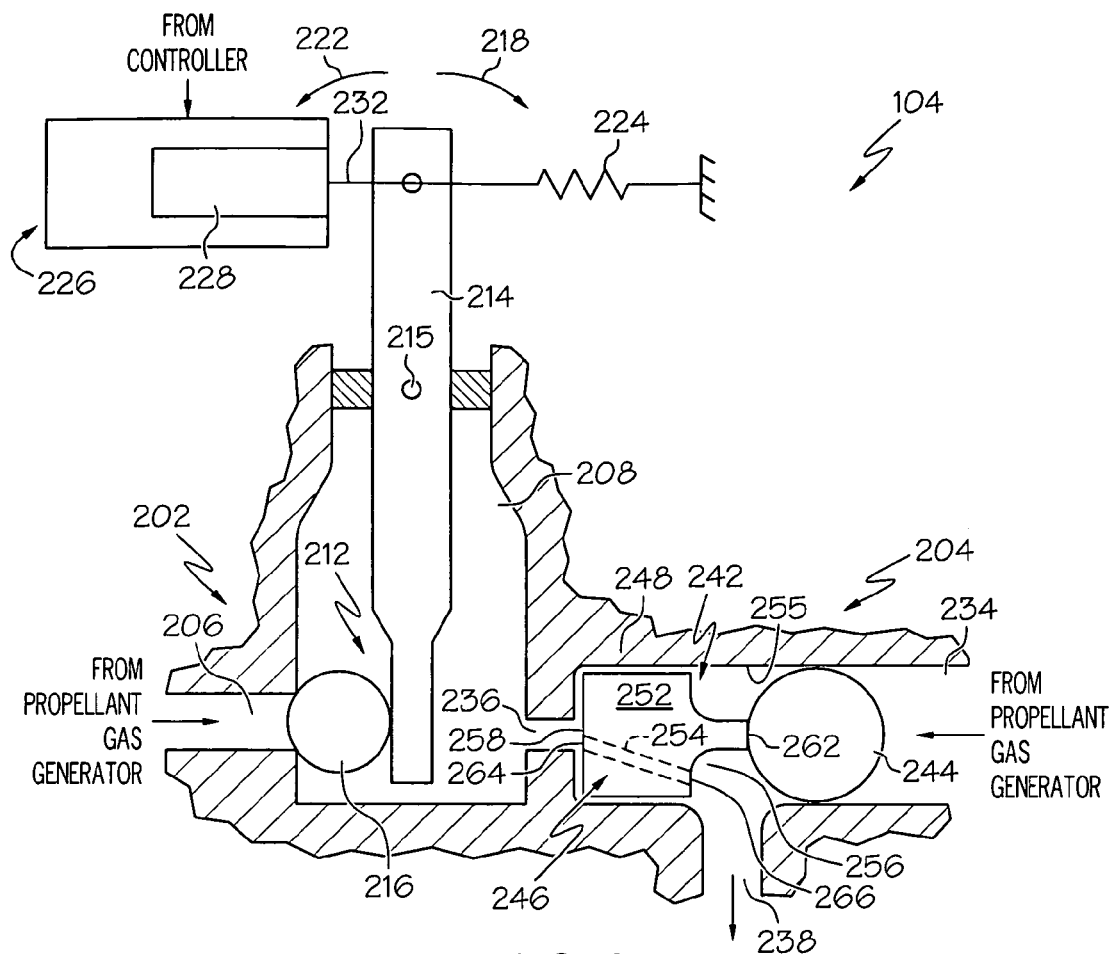
FIG. 2 is a schematic representation of an exemplary embodiment of a gas control valve that may be used to implement the system of FIG. 1.

With reference now to FIG. 2, a schematic representation of a preferred embodiment of one of the gas control valves 104 is depicted and will be described. The gas control valve 104 includes a pilot stage 202 and a main stage 204. The pilot stage 202 includes an inlet port 206, a pilot chamber 208, and a valve 212. The pilot stage inlet port is coupled to receive propellant gas from the propellant gas generator 102. The pilot stage 202 is also coupled to receive control signals from the controller 106. The pilot stage 202 is operable, in response to the control signals, to move the pilot stage valve 212 between a closed position, which is the position depicted in FIG. 2, and an open position. As FIG. 2 readily shows, when the pilot stage valve 212 is in the closed position the pilot stage inlet port 206 is not in fluid communication with the pilot chamber 208. Conversely, when the pilot stage valve 212 is in the open position the pilot stage inlet port 206 is in fluid communication with the pilot chamber 208.

In the preferred embodiment, the pilot stage valve 212 is implemented as a flapper-type device, and includes a flapper 214 and a valve element 216. The flapper 214 is disposed, at least partially, within the pilot chamber 208 and is rotationally mounted. The flapper 214 may thus rotate, about a rotational axis 215, in a first rotational direction 218 and a second rotational direction 222. The valve element 216 is disposed within the pilot chamber 208 between the flapper 214 and the pilot stage inlet port 216. As will become apparent from further discussions, the valve element 216 is at least partially responsive to rotational movement of the flapper 214 to move between a first position, which is the position depicted in FIG. 2, and a second position. It should be noted that the first and second positions of the valve element 216 correspond to the above-described closed and open positions, respectively, of the pilot stage 202. It is further noted that the valve element 216, at least in the depicted embodiment, is implemented as a substantially spherical valve element. This is merely exemplary of a particular preferred embodiment, and in other embodiments the valve element 216 could be implemented as a substantially conical valve element or a closely matched flat element, just to name a few alternatives.

As FIG. 2 further depicts, the pilot stage 202 also includes a spring 224 and an actuator 226. The spring 224 is coupled to, and is configured to supply a bias force to, the flapper 214. The bias force that the spring 224 supplies to the flapper 214 urges the flapper to rotate in the first rotational direction 218, which in turn urges the substantially spherical valve element 216 toward the first position (e.g., the closed position). It will be appreciated that the pilot stage inlet port 206, the substantially spherical valve element 216, and the spring 224 are configured such that the pressure force exerted on the substantially spherical valve element 216 from the propellant gas is alone insufficient to overcome the bias force supplied thereto from the flapper 214 and spring 224. However, when an actuation force is supplied to the flapper 214 from the pilot stage actuator 226, the actuation force, in combination with the pressure force from the propellant gas, the flapper 214 will rotate in the second rotational direction 222. As a result, the substantially spherical valve element 216 will move, due to the pressure force exerted thereon, toward the second position (e.g., open position), allowing propellant gas to enter and pressurize the pilot chamber 208.

It is noted that the pilot stage actuator 226 may be variously configured and implemented. In the depicted embodiment, however, the pilot stage actuator 226 is implemented using a solenoid-type valve actuator that is selectively energized and de-energized by the controller 106, and that includes a solenoid 228 and a shaft 232. The control signals supplied by the controller 106 are preferably supplied to the solenoid 228. As noted above, the control signals comprise pulses, with each pulse having a pulse width modulated (PWM) duty cycle. It may thus be appreciated that when the control signal is in a logic-high state the solenoid 228 is energized, and when the thrust control signal is in a logic-low state the solenoid 228 is de-energized. The solenoid 228 is configured such that when it is de-energized, the shaft 232 is free to move under the influence of the spring 224. Conversely, when the solenoid 228 is energized, the shaft 232 is retracted, which supplies the actuation force to the flapper 214 and allows the substantially spherical valve element 216 to move to the second (e.g., open) position. It is noted that the logic could be reversed, if needed or desired. In such instances, the shaft 232 would be retracted when the solenoid 228 is de-energized, and would extend when the solenoid 228 is energized.

Turning now to the main stage 204, this portion of the gas control valve 104 includes an inlet port 234, a control pressure port 236, an outlet port 238, and a valve 242. The main stage inlet port 234, like the pilot stage inlet port 206, is coupled to receive propellant gas from the propellant gas generator 102. The main stage control pressure port 236 is in fluid communication with the pilot chamber 208, and the pilot stage outlet port 238 is in fluid communication with a thrust nozzle 124 (not depicted in FIG. 2). The main stage valve 242 is responsive to differential gas pressure between the main stage inlet port 234 and the pilot chamber 208 to move between a low flow position and a plurality of high flow positions. In the low flow position, the main stage control pressure port 236 is in fluid communication with the main stage outlet port 238 and the main stage inlet port 234 is not in fluid communication with the main stage valve outlet port 238. In each of the plurality of high flow positions, at least the main stage inlet port 234 is in fluid communication with the main stage valve outlet port 238.

To implement the above-described functionality, the main stage valve 242 includes a valve element 244 and a main stage actuator 246. The valve element 244 is in fluid communication with the main stage inlet port 234 and is movable between a first position and a second position. In the first position (which is the position depicted in FIG. 2), the main stage inlet port 234 is not in fluid communication with the main stage outlet port 238. Conversely, in the second position, the main stage inlet port 234 is in fluid communication with the main stage valve outlet port 238. It should be noted that the first and second positions of the valve element 244 correspond to the above-described closed and open positions, respectively, of the main stage 204.

The valve element 244 is moved between the first and second positions, at least in part, by the main stage actuator 246. The main stage actuator 246 includes a housing portion 248, an actuation element 252, and a flow passage 254. The housing portion has an inner surface 255 that defines an actuator chamber 256. The actuation element 252 is disposed within the actuator chamber 256 and includes at least a first end 258 that is in fluid communication with the main stage control pressure port 236, and a second end 262 that at least engages the valve element 244. The flow passage 254 includes an inlet 264 that is in fluid communication with the main stage control pressure port 236, and an outlet 266 that is in fluid communication with the main stage outlet port 262.

It is noted that in the depicted embodiment, the flow passage 254 is formed in and extends through the actuation element 252. As will be described further below, however, this is merely exemplary of a particular embodiment and the flow passage 254 could be alternatively disposed. No matter the specific disposition of the flow passage 254, it is further noted that the flow passage 254, the main stage valve 242, and the main stage control port 236 are configured such that, when propellant gas flows into the pilot chamber 208, propellant gas pressure in the pilot chamber 208 must rise at a greater rate than it is being vented by the flow passage 254 in order to exert a sufficient pressure force on the main stage valve 242 to move it from the low flow position to the high flow position.

Having described an embodiment of each of the gas control valves 104 from a structural standpoint, and the operation of the individual elements that make up the gas control valves 104, a description of the overall operation of the gas control valves 104 will now be provided. When the solenoid 228 is de-energized (e.g., the control signal from the controller 106 is in a logic-low state), the shaft 232 is free to move and the force supplied by the spring 224 urges the flapper 214 to rotate in the first rotational direction 218, which seats the substantially spherical valve element 216 against the pilot stage inlet port 206. As a result, the pilot chamber 208 is vented to ambient pressure via the flow passage 254 and the main stage outlet port 238. As was noted above, propellant gas pressure at the pilot stage inlet port 206 is insufficient to overcome the bias force of the spring and open the pilot stage valve 212. Moreover, the differential pressure between the main stage inlet port 234 and the pilot chamber 208 urges the main stage valve 242 to the low flow position. As was also noted above, in the low flow position the main stage inlet port 234 is not in fluid communication with the main stage valve outlet port 238; however, the main stage control pressure port 236 is in fluid communication with the main stage outlet port 238 via the flow passage 254. Nonetheless, because the pilot stage valve 212 is closed, there is no propellant gas flow through the flow passage 254.

When the solenoid 228 is energized, (e.g., the control signal from the controller 106 is in a logic-high state), the shaft 232 is retracted and supplies an actuation force to the flapper 214. The actuation force combined with the pressure force exerted on the substantially spherical valve element 216 overcomes the force supplied by the spring 224, which urges the flapper 214 to rotate in the second rotational direction 222. As a result, the substantially spherical valve element 216 is unseated from pilot stage inlet port 206, allowing propellant gas to flow into the pilot chamber 208. Initially, at least some of propellant gas flowing into the pilot chamber 208 will flow through the flow passage 254 and out the main stage outlet port 238, thereby venting the pilot chamber 208. However, if the solenoid 228 remains energized or, as will be described more fully below, is energized for at least a predetermined time (e.g., the PWM duty cycle of the control signal exceeds a predetermined value), propellant gas pressure in the pilot chamber 208 will rise at a greater rate than it is being vented by the flow passage 254. As propellant gas pressure in the pilot chamber 208 rises, the differential pressure between the main stage inlet port 234 and the pilot chamber 208 also rises. When the differential pressure reaches a predetermined pressure value, the main stage valve 242 will move to the high flow position. As was also noted above, in the high flow position the main stage inlet port 234 is in fluid communication with the main stage valve outlet port 238, and propellant gas flows through the main stage outlet port 238 to, for example, a non-illustrated thrust nozzle 124.

When the solenoid 228 is subsequently de-energized, the shaft 232 is once again free to move. Hence, the force supplied by the spring 224 urges the flapper 214 to rotate in the first rotational direction 218, which re-seats the substantially spherical valve element 216 against the pilot stage inlet port 206. The propellant gas in the pilot chamber 208 is thus vented to ambient pressure via the flow passage 254 and the main stage outlet port 238, causing a reduction in pressure in the pilot chamber 208. As a result, the differential pressure between the main stage inlet port 234 and the pilot chamber 208 urges the main stage valve 242 to the low flow position.

The gas control valve 104 responds as described in the above paragraphs whenever the solenoid 228 is energized for at least a predetermined time (e.g., the PWM duty cycle of the control signal exceeds a predetermined value), and thus the pilot stage valve 212 is moved to the open position for the predetermined time. It is noted, however, that whenever the controller 106 supplies control signals having a PWM duty cycle less than the predetermined duty cycle (e.g., the solenoid 228 is energized for less than the predetermined time), then only the pilot stage valve 212 will respond. This is because there is insufficient time for propellant gas pressure in the pilot chamber 208 to increase to a level that will cause the main stage valve 242 to move to the open position. However, propellant gas does flow from the pilot chamber 208, through the flow passage 254, and out the main stage outlet port 238 to a non-illustrated thrust nozzle 124. This response results in relatively short and relatively low flow propellant gas pulses, which allows the gas control valve 104 and its associated thrust nozzle 124 to exhibit relatively fine MIB performance.

Figure 3:
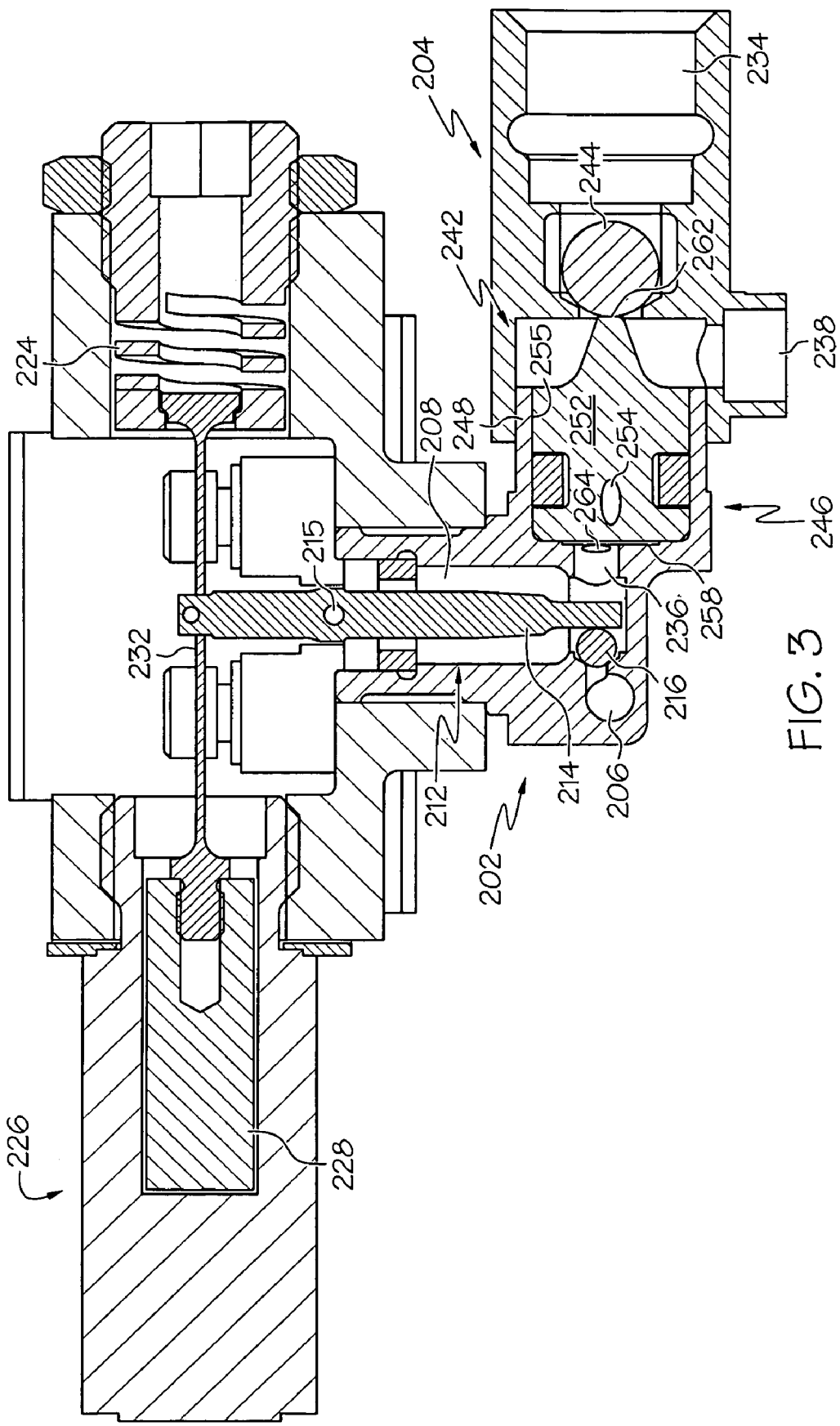
FIGS. 3 and 4 depict exemplary physical implementations of the gas control valve of FIG. 2.
Figure 4:
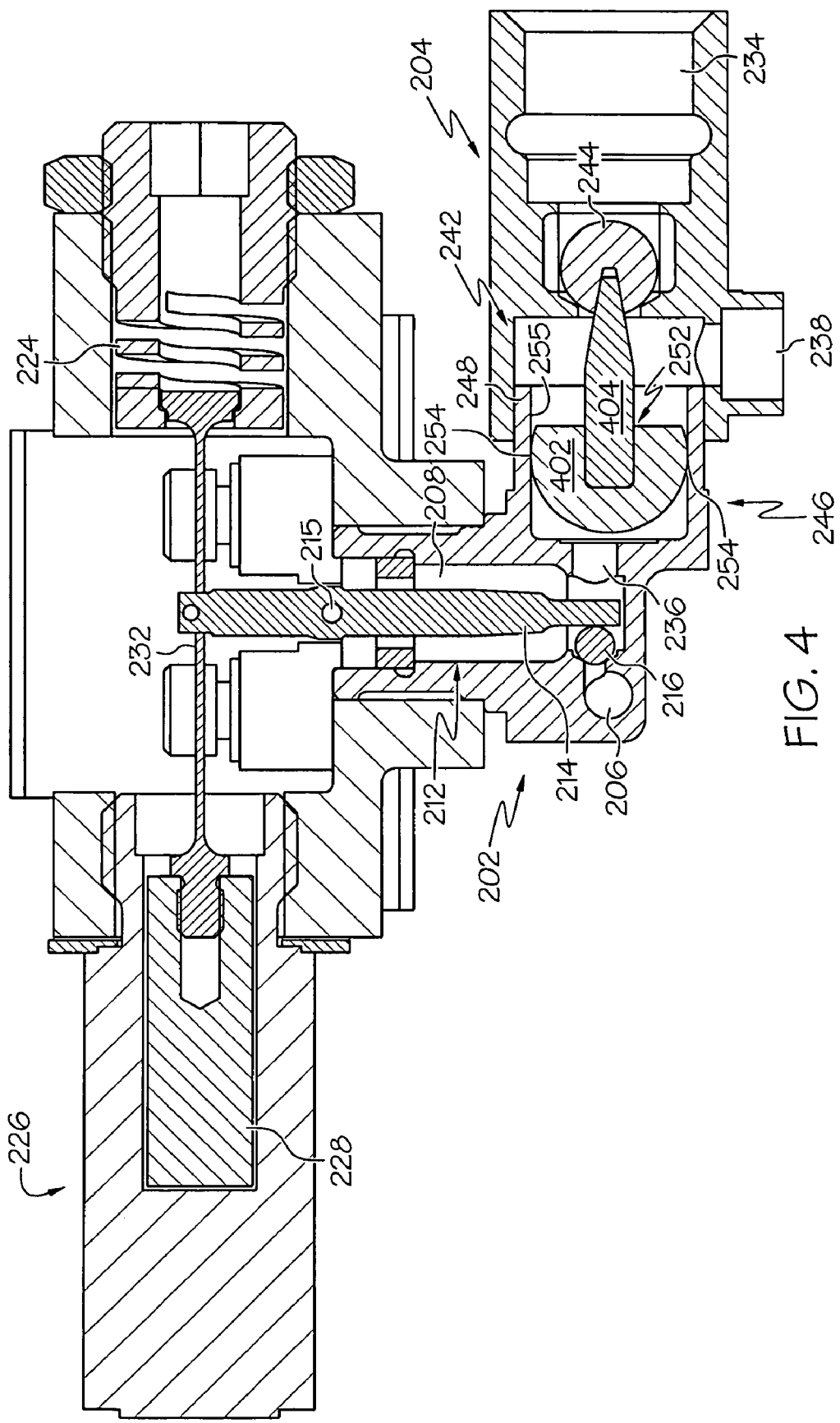

The gas control valve 104 described above and depicted in FIG. 2 may be physically implemented in accordance with various configurations. Two different exemplary configurations of actual physical implementations are depicted in FIGS. 3 and 4. It is noted that the reference numerals in FIGS. 3 and 4 are used to refer to like parts of FIG. 2, and as such each of these several parts will not be further discussed. While the configuration of each of the parts that make up each of the two embodiments is quite similar (if not identical), it may be readily seen that the main stage actuation element 252 in each embodiment differs. More specifically, in the embodiment depicted in FIG. 3 the main stage actuation element 252 is implemented as a piston, through which the flow passage 254 extends. In the embodiment depicted in FIG. 4, the main stage actuation element 252 is implemented using an end element 402 that is at least partially spherical and a push rod 404 that is coupled to the end element and that engages or is otherwise coupled to the valve element 244. With this embodiment, the flow passage 254 is formed by a clearance between the housing portion inner surface 255 and the end element 402.

Figure 5:
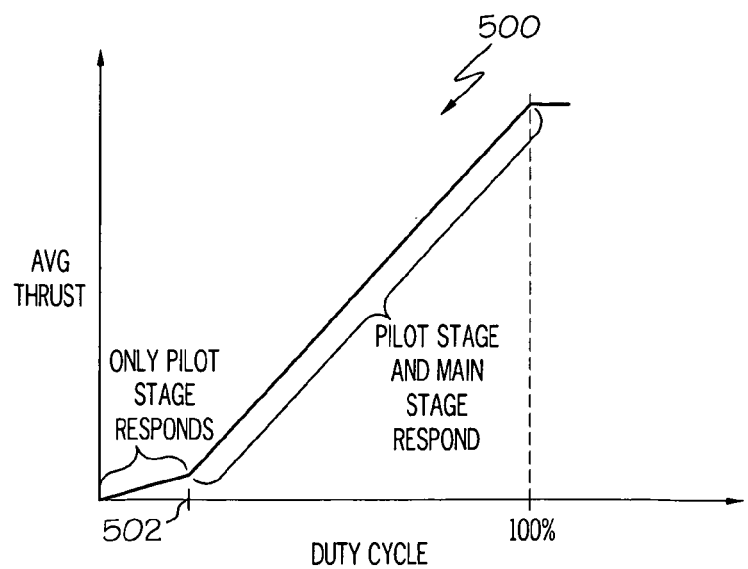
FIG. 5 is a graph that depicts time-averaged thrust versus pulse width modulated (PWM) duty cycle that may be exhibited by a thruster that is controlled by the gas control valve of FIGS. 2-4.

No matter its specific physical implementation, the gas control valve 104 described herein is capable of controlling propellant gas flow to a thrust nozzle 124 so that the thrust nozzle 124 may produce thrust over a relatively wide range. For example, it can allow a thrust nozzle 124 to produce thrust from about 2 lbf to about 20 lbf. The amount of thrust produced may depend, as described above, upon the duty cycle of the control signals supplied to the pilot stage actuator 226. The control signal duty cycle more specifically determines whether only the pilot stage valve 212 responds or whether both the pilot stage valve 212 and main stage valve 242 will respond. This operational characteristic is graphically depicted in FIG. 5, in which the time-average thrust produced by a thrust nozzle 124 is plotted against the PWM duty cycle of the control signals supplied to the pilot stage actuator 226. This graph 500 clearly shows that for relatively short duty cycles (e.g., less than the predetermined duty cycle 502) only the pilot stage valve 212 responds, and the time-averaged thrust is relatively low. Conversely, for relatively longer duty cycles (e.g., greater than the predetermined duty cycle 502) the pilot stage valve 212 and main stage valve 242 both respond, and the time-averaged thrust increases significantly as the PWM duty cycle increases from the predetermined duty cycle to a 100% duty cycle. As used herein, duty cycle refers to the fraction of time that the valve control signal is in the logic-high state relative to the time period of the PWM control signal issued from the controller 106.

The gas control valve 104 disclosed herein allows an associated thrust nozzle 124 to supply thrust over a relatively wide range, from a relatively low value to a relatively high thrust value. The gas control valve and system also provide for the selective or collective control of solid propellant burn rate, combustion chamber pressure and propellant gas flow. The gas control valve and system thus conserve propellant utilization, which can extend burn duration, range, and mission flexibility of projectile systems and backup power systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas control valve, comprising:
   a pilot stage including an inlet port, a pilot chamber, and a valve, the pilot stage inlet port adapted to receive pressurized gas from a pressurized gas source, the pilot stage adapted to receive control signals and operable, in response to the control signals, to move the pilot stage valve between a closed position, in which the pilot stage inlet port is not in fluid communication with the pilot stage pilot chamber, and an open position, in which the pilot stage inlet port is in fluid communication with the pilot stage pilot chamber; and
   a main stage including an inlet port, a control pressure port, an outlet port, and a valve, the main stage inlet port adapted to receive pressurized gas from the pressurized gas source, the main stage control pressure port in fluid communication with the pilot stage pilot chamber, the main stage valve responsive to differential gas pressure between the main stage inlet port and the pilot stage pilot chamber to move between a low flow position and a plurality of high flow positions,
   wherein:
   the pilot stage valve comprises:
      a flapper disposed at least partially within the pilot stage pilot chamber and movable therein; and
      a substantially spherical valve element disposed within the pilot stage pilot chamber between the flapper and the pilot stage inlet port, the substantially spherical valve element at least partially responsive to movement of the flapper to move between a first position and a second position, which correspond to the closed position and the open position, respectively,
   and wherein:
      in the low flow position, the main stage control pressure port is in fluid communication with the main stage outlet port and the main stage inlet port is not in fluid communication with the main stage valve outlet port, and
      in each of the plurality of high flow positions, at least the main stage inlet port is in fluid communication with the main stage valve outlet port.

2. The valve of claim 1, further comprising:
   a spring coupled to the flapper and configured to supply a bias force thereto that urges a portion of the flapper toward the pilot stage inlet port, to thereby urge the substantially spherical valve element toward the first position; and
   an actuator coupled to the flapper, the actuator adapted to receive the control signals and operable, in response to the control signals, to supply an actuation force to the flapper that urges the portion of the flapper away from the pilot stage inlet port, to thereby allow the substantially spherical valve element to move toward the second position.

3. The valve of claim 2, wherein:
   the flapper is rotationally mounted and rotatable in a first rotational direction and a second rotational direction;
   the bias force urges the flapper to rotate in the first rotational direction; and
   the actuation force urges the flapper to rotate in the second rotational direction.

4. The valve of claim 2, wherein the actuator comprises a solenoid.

5. The valve of claim 1, wherein the main stage valve comprises:
   a valve element in fluid communication with the main stage inlet port and movable between a first position, in which the main stage inlet port is not in fluid communication with the main stage outlet port, and a second position, in which the main stage inlet port is in fluid communication with the main stage valve outlet port;
   a main stage actuator configured to at least selectively move the valve element from the first position to the second position, the main stage actuator comprising:
      a housing portion having an inner surface that defines an actuator chamber,
      an actuation element disposed within the actuator chamber and including at least a first end and a second end, the actuation element first end in fluid communication with the main stage control pressure port, the actuation member second end at least engaging the valve element, and
      a flow passage including an inlet and an outlet, the flow passage inlet in fluid communication with the main stage control pressure port, the flow passage outlet in fluid communication with the main stage outlet port.

6. The valve of claim 5, wherein the flow passage is formed in and extends through the actuation element.

7. The valve of claim 6, wherein the actuation element comprises a piston including at least a first end and a second end, the piston first end in fluid communication with the main stage control pressure port, the piston second end at least engaging the valve element.

8. The valve of claim 6, wherein the flow passage is formed by a clearance between the housing inner surface and the actuation element.

9. The valve element of claim 8, wherein the actuation element comprises:
   an end element that is at least partially spherical; and
   a push rod coupled to the end element and at least engaging the valve element.

10. A gas control valve, comprising:
    a pilot stage including an inlet port, a pilot chamber, a flapper, and a substantially spherical valve element, the pilot stage inlet port adapted to receive pressurized gas from a pressurized gas source, the flapper disposed at least partially within the pilot stage pilot chamber and movable therein, the substantially spherical valve element disposed within the pilot stage pilot chamber between the flapper and the pilot stage inlet port, the valve element at least partially responsive to movement of the flapper to move between a first position, in which the pilot stage inlet port is not in fluid communication with the pilot stage pilot chamber, and a second position, in which the pilot stage inlet port is in fluid communication with the pilot stage pilot chamber; and a main stage including an inlet port, a control pressure port, an outlet port, and a valve, the main stage inlet port adapted to receive pressurized gas from the pressurized gas source, the main stage control pressure port in fluid communication with the pilot stage pilot chamber, the main stage valve comprising:
- a valve element in fluid communication with the main stage inlet port and movable between a low flow position, in which the main stage inlet port is not in fluid communication with the main stage outlet port, and a plurality of high flow positions, in which the main stage inlet port is in fluid communication with the main stage valve outlet port, and
- a main stage actuator responsive to differential gas pressure between the main stage inlet port and the pilot stage pilot chamber to move the main stage valve element between the low flow position and the plurality of high flow positions, the main stage actuator comprising:
  - a housing portion having an inner surface that defines an actuator chamber,
  - an actuation element disposed within the actuator chamber and including at least a first end and a second end, the actuation element first end in fluid communication with the main stage control pressure port, the actuation element second end at least engaging the valve element, and
  - a flow passage including an inlet and an outlet, the flow passage inlet in fluid communication with the main stage control pressure port, the flow passage outlet in fluid communication with the main stage outlet port.

11. The valve of claim 10, further comprising:
a spring coupled to the flapper and configured to supply a bias force thereto that urges a portion of the flapper toward the pilot stage inlet port, to thereby urge the valve element toward the first position; and
an actuator coupled to the flapper, the actuator adapted to receive the control signals and operable, in response to the control signals, to supply an actuation force to the flapper that urges the portion of the flapper away from the pilot stage inlet port, to thereby allow the valve element to move toward the second position.

12. The valve of claim 10, wherein:
the flapper is rotationally mounted and rotatable in a first rotational direction and a second rotational direction;
the bias force urges the flapper to rotate in the first rotational direction; and
the actuation force urges the flapper to rotate in the second rotational direction.

13. The valve of claim 10, wherein:
the actuation element comprises a piston including at least a first end and a second end, the piston first end in fluid communication with the main stage control pressure port, the piston second end at least engaging the valve element; and
the flow passage is formed in and extends through the actuation element.

14. The valve element of claim 10, wherein
the actuation element comprises (i) an end element that is at least partially spherical and (ii) a push rod coupled to the end element and at least engaging the valve element; and
the flow passage is formed by a clearance between the housing inner surface and the end element.

15. A propellant management control system, comprising:
a propellant gas generator having propellant disposed therein, the propellant configured to generate propellant gas upon being ignited;
a controller operable to selectively supply control signals; and
a propellant gas control valve coupled to receive propellant gas from the propellant gas generator, the propellant gas control valve further coupled to receive the control signals and operable, in response thereto, to selectively discharge the received propellant gas, the propellant gas control valve comprising:
- a pilot stage including an inlet port, a pilot chamber, and a valve, the pilot stage inlet port coupled to receive propellant gas from the propellant gas generator, the pilot stage coupled to receive the control signals and operable, in response thereto, to move the pilot stage valve between a closed position, in which the pilot stage inlet port is not in fluid communication with the pilot stage pilot chamber, and an open position, in which the pilot stage inlet port is in fluid communication with the pilot stage pilot chamber; and
- a main stage including an inlet port, a control pressure port, an outlet port, and a valve, the main stage inlet port coupled to receive propellant gas from the propellant gas generator, the main stage control pressure port in fluid communication with the pilot stage pilot chamber, the main stage valve responsive to differential gas pressure between the main stage inlet port and the pilot stage pilot chamber to move between a low flow position and a plurality of high flow positions, wherein:
  - in the low flow position, the main stage control pressure port is in fluid communication with the main stage outlet port and the main stage inlet port is not in fluid communication with the main stage valve outlet port, and
  - in each of the plurality of high flow positions, at least the main stage inlet port is in fluid communication with the main stage valve outlet port.

16. The system of claim 15, wherein:
the control signals comprise pulses, each pulse having a duty cycle; and
the propellant gas control valve is configured such that (i) the main stage valve is in the low flow position when the duty cycle of the control signal pulses is less than a predetermined duty cycle value and (ii) the main stage valve moves to a high flow position when the duty cycle of the control signal pulses is greater than the predetermined duty cycle value.

17. The system of claim 15, wherein the controller is further operable to selectively supply the control signals to control propellant burn rate.

18. The system of claim 15, wherein the controller is further operable to selectively supply the control signals to control propellant gas pressure in the propellant gas generator.

19. The system of claim 15, wherein the controller is further operable to selectively supply the control signals to control generation of propellant gas pressure pulses in the propellant gas generator.

* * * * *